United States Patent [19]
Wood et al.

[11] Patent Number: 5,887,953
[45] Date of Patent: Mar. 30, 1999

[54] DUAL PNEUMATIC TRAINLINE CONTROL UNIT

[75] Inventors: James A. Wood, Spartanburg; Richard J. Mazur, Greer, both of S.C.

[73] Assignee: Westinghouse Air Brake Company, Wilmerding, Pa.

[21] Appl. No.: 789,754

[22] Filed: Jan. 28, 1997

[51] Int. Cl.[6] .................................................. B60T 13/00
[52] U.S. Cl. ................................................. 303/7; 303/15
[58] Field of Search ............................... 303/3, 7, 15, 20, 303/64, 66, 69, 81, 26, 29, 30, 36, 37

[56] References Cited

U.S. PATENT DOCUMENTS

| | | | |
|---|---|---|---|
| 4,830,437 | 5/1989 | Rumsey | 303/15 X |
| 5,222,788 | 6/1993 | Dimsa et al. | 303/15 |
| 5,503,469 | 4/1996 | Cunkelman | 303/15 |
| 5,735,579 | 4/1998 | Wood et al. | 303/7 |
| 5,738,417 | 4/1998 | Wood et al. | 303/15 X |

*Primary Examiner*—Lee W. Young
*Attorney, Agent, or Firm*—James Ray & Associates

[57] ABSTRACT

A control unit includes several magnet and air piloted valves, a transducer, a transmitter, a pressure switch and a pipe network. Controlled by a central controller, the apply and release valves allow a first trainline to charge the pipe network or vent to atmosphere whereas the emergency release valve can vent a second trainline to atmosphere. The transfer valve connects the first trainline to a command port of the control unit unless its pilot port receives an emergency braking request in which case it connects the pipe network to the command port. The transducer converts pressure in the first trainline to an electrical signal. The transmitter conveys this signal to a control bus. The pressure switch closes if the second trainline charges to a preset pressure. Upon closure of the pressure switch and a command from the controller, the charging valve allows the pipe network to charge the second trainline to a threshold level. The maintaining valve permits the pipe network to charge the second trainline unless pressure at its pilot port falls below the threshold. The regulating valve regulates air from a primary port of the control unit for use in the pipe network. The pipe network allows the apply valve, the first trainline and the regulating valve to supply air to the transfer valve, charging valve, maintaining valve and a master port of the control unit. When pressure in the second trainline drops faster than a predetermined rate, the vent valve vents the second trainline to atmosphere.

24 Claims, 7 Drawing Sheets

_, _

DUAL PNEUMATIC TRAINLINE CONTROL UNIT

CROSS-REFERENCE TO RELATED APPLICATIONS

This application is related to copending applications Ser. No. 08/790,574 and 08/789,919, entitled Universal Pneumatic Brake Control Unit and Brake Assurance Module, respectively, sharing the same filing date of the present application, Jan. 28, 1997. These patent applications are assigned to the assignee of the present invention and their teachings are incorporated into the present document by reference.

FIELD OF THE INVENTION

The present invention generally relates to a pneumatic trainline control unit for use within a brake control system to aid in the control of the brakes on at least one truck of a rail vehicle. More particularly, the present invention relates to a pneumatic trainline control unit that aids in charging, maintaining and reducing pressure in designated pneumatic trainlines and that serves as all the sources of pressure for the brake control system on the rail vehicle.

BACKGROUND OF THE INVENTION

Modern train brake control systems typically use a central controller to control the brakes of the rail vehicles that comprise the train. A train operator located in the lead locomotive manipulates the brake handles of the train to apply and release the brakes of the trucks on each rail vehicle as desired. The inputs from the brake handles are typically processed by a cab control unit and passed to the central controller. In response to these and other inputs, the central controller sends a brake command signal to each of the rail vehicles along a pneumatic or an electrical trainline or both. The brake command signal can be the carrier of a request for service braking or one for emergency braking or even both. Brake equipment on each rail vehicle applies or releases the brakes according to the dictates of the particular brake command signal received.

Depending on the type of brake control system, the service and emergency braking requests may be carried on the same or separate pneumatic trainlines. In the WABCO 26-C Brake Control System, the brake pipe is used to convey both the service and emergency braking requests. In the WABCO RT-2 Brake Control System, the straight air pipe conveys the service braking requests while the brake pipe carries the emergency braking requests.

The brake equipment on each rail vehicle may include either exclusively pneumatic equipment or a combination of electrical and pneumatic (i.e., electropneumatic) equipment. In those rail vehicles featuring only pneumatic brake equipment, the central controller sends the brake command signal along a pneumatic trainline to each rail vehicle. The pneumatic brake equipment on each rail vehicle responds pneumatically to apply or release the brakes according to the dictates of the pneumatic brake command signal. In those rail vehicles featuring electropneumatic brake equipment, each rail vehicle typically includes a master electronic unit (MEU) whose construction and operation are generally well known in the brake control art. The central controller sends the brake command signal to each rail vehicle along either a pneumatic or an electrical trainline or both.

The MEU on each rail vehicle receives this brake command signal and various other signals in response to which it directly controls the electropneumatic equipment according to principles well known in the brake control art. Specifically, the MEU generates the electrical signals which directly open or close the various valves of the prior art electropneumatic equipment which supply pressure to or vent pressure from the brake cylinders. The brakes of all the trucks on the rail vehicle apply and release accordingly.

The exclusively pneumatic equipment and the electropneumatic equipment of the prior art brake control systems discussed previously have certain disadvantages when compared to the inventions set forth below and in related applications. Such prior art equipment typically provides service braking, emergency braking and wheel slip and spin control functions from separate components. This requires a lot of space. Moreover, each component in these prior art systems is typically physically separated from the electronics that controls it. Large amounts of wiring are therefore required to interconnect each component and its controlling electronics. Each rail vehicle, of course, bears the weight of this wiring.

It would therefore be highly desirable to have brake equipment in which service braking and emergency braking functions and, if desired, wheel slip and spin control functions can be consolidated along with their associated electronics within a single, and comparatively small, package. The amount of wiring that would be required to interconnect the various electropneumatic components and their associated electronics in each package would be significantly reduced as compared to the prior art equipment. This would reduce the weight that each rail vehicle would be required to bear. The single enclosure for each of the components and their associated electronics would also afford better protection from adverse environmental conditions.

It would also be highly desirable to control the brakes at the truck level. In those prior art systems featuring only pneumatic brake equipment on each rail vehicle, the brakes are controlled only at the rail vehicle or train level. Similarly, in those prior art brake control systems featuring electropneumatic brake equipment on each rail vehicle, the MEU is used to control the brakes only at the rail vehicle level. By controlling the brakes at each truck individually, this would allow for better overall control of the brakes given the inevitable variations in load weight, motion, wheel slippage and other factors affecting each rail vehicle.

It would also be highly desirable to design such a package that either by itself or in conjunction with one or more other novel devices can be used within and made a part of a variety of train brake control systems such as those used to control passenger trains, subway trains and trolleys.

It should be noted that the foregoing background information is provided to assist the reader in understanding the present invention. Accordingly, any terms of art used herein are not intended to be limited to any particular narrow interpretation unless specifically stated otherwise in this document.

SUMMARY OF THE INVENTION

The present invention provides a pneumatic trainline control unit for use with a universal pneumatic brake control unit on a train. The train includes a first pneumatic trainline for conveying service and release braking requests, a second pneumatic trainline for conveying an emergency braking request and a central controller for issuing the braking requests. In a presently preferred embodiment, the control unit includes an apply valve, a release valve, an emergency transfer valve, a transducer, a transmission means, a low pressure switch, a charging valve, an emergency release valve, a maintaining valve, a regulating valve, a pipe network and a vent valve. When opened by the central controller, the apply valve allows air from the first trainline to flow to a pipe network. When opened by the central controller, the release valve vents air from the first trainline to atmosphere. The emergency transfer valve has a transfer pilot port in communication with the second trainline. The emergency transfer valve permits the first trainline to communicate with a command port of the control unit unless its transfer pilot port receives the emergency braking request in which case it permits the pipe network to communicate with the command port. The transducer converts pressure received from the first trainline to an electrical brake command signal. The transmission means communicates the brake command signal to a brake control bus. The low pressure switch closes when pressure in the second trainline reaches or exceeds a preset low pressure. When opened upon both closure of the low pressure switch and a manually initiated command from the central controller, the charging valve allows air from the pipe network to charge the second trainline to at least a minimum threshold pressure. When opened by the central controller, the emergency release valve vents air from the second trainline to atmosphere. The maintaining valve has a main pilot port in communication with the second trainline. The maintaining valve maintains pressure within the second trainline by permitting air from the pipe network to charge the second trainline via a choke unless pressure at its main pilot port falls below the minimum threshold in which case the maintaining valve closes thereby preventing air from the pipe network from so charging the second trainline. The regulating valve receives air from a primary port of the control unit and regulates same for supply to the pipe network. The pipe network allows air received from the apply valve, the first trainline and the regulating valve to flow to the emergency transfer valve, the charging valve, the maintaining valve and a master port of the control unit. When pressure within the second trainline drops faster than a predetermined rate, the vent valve vents air from the second trainline to atmosphere.

OBJECTIVES OF THE INVENTION

It is a primary objective of the present invention to provide a pneumatic trainline control unit that serves as conduit for or provider of all the sources of pressure for a universal pneumatic brake control unit within an RT-2 Brake Control System.

Another objective of the present invention is to provide a pneumatic trainline control unit for use with a brake control system to assist in controlling the brakes on at least one truck of a rail vehicle.

Yet another objective of the present invention is to provide a pneumatic trainline control unit that assists in charging, maintaining and reducing pressure with designated pneumatic trainlines.

In addition to the objectives and advantages listed above, various other objects and advantages of the present invention will become more readily apparent to persons skilled in the relevant art from a reading of the detailed description section of this document. Such other objects and advantages will become particularly apparent when the detailed description is considered along with the attached drawings and with the appended claims.

DETAILED DESCRIPTION OF THE INVENTION

Figure 1:
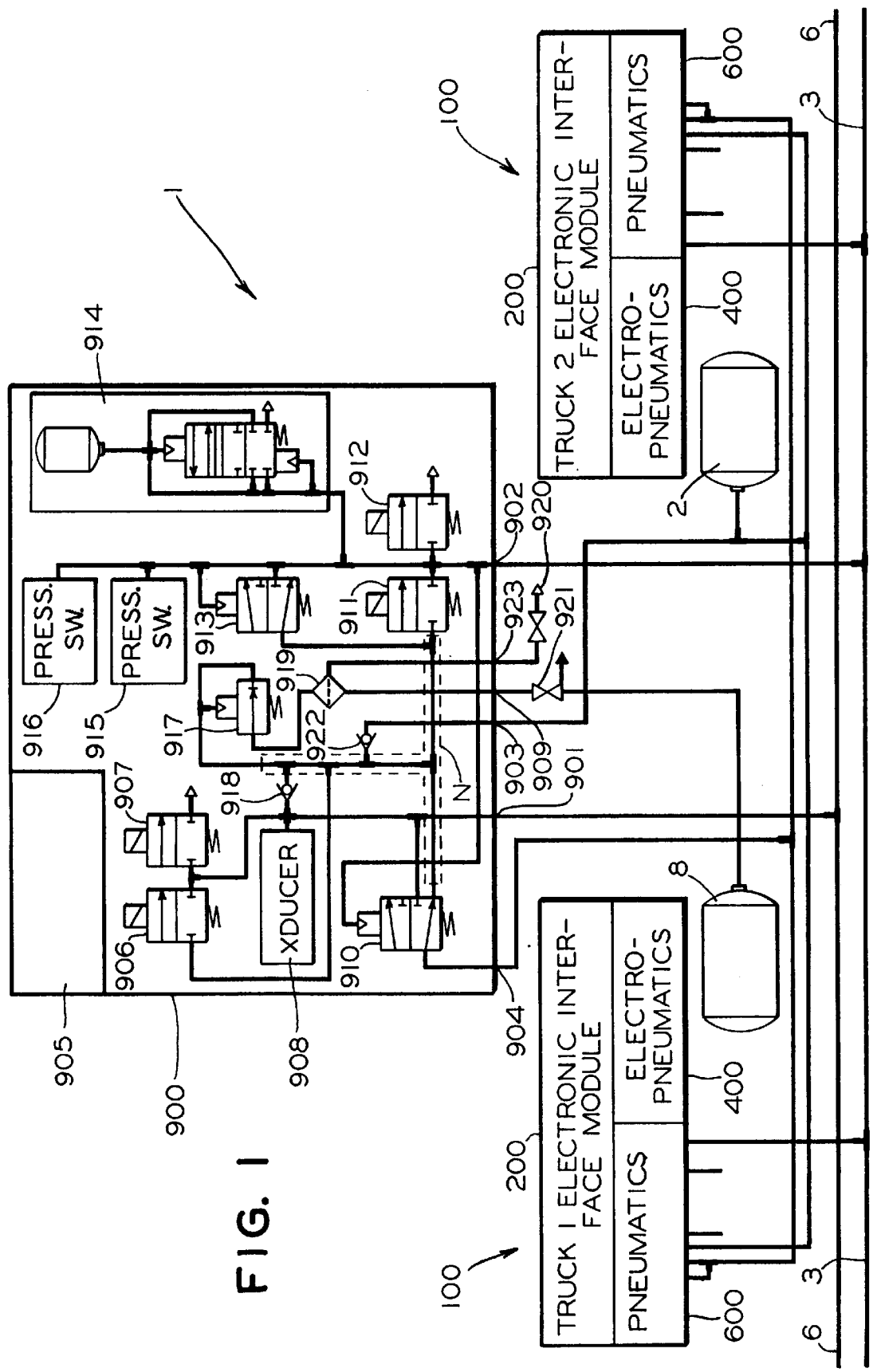
FIG. 1 is a partial schematic view of a brake control system in which the present invention has been incorporated along with a universal brake control unit.

Before describing the present invention in detail, the reader is advised that, for the sake of clarity and understanding, identical components having identical functions in each of the accompanying drawings have been marked with the same reference numerals in each of the Figures provided in this document.

FIG. 1 illustrates the essential details of a presently preferred embodiment of the present invention, namely, a straight air pipe and brake pipe control unit, generally designated 900. Though it can be used within and made a part of a variety of train brake control systems, the SAP & BP control unit 900 is depicted within a WABCO RT-2 Brake Control System, generally designated 1, to aid in the control of the brakes of at least one truck on a rail vehicle.

FIG. 1 illustrates that SAP & BP control unit 900 may be used in conjunction with two universal pneumatic brake control units 100 in the RT-2 Brake Control System 1. For reasons that will become more apparent from a reading of the ensuing paragraphs, one universal unit is preferably used to control the brakes on one truck of the rail vehicle.

Figure 2:
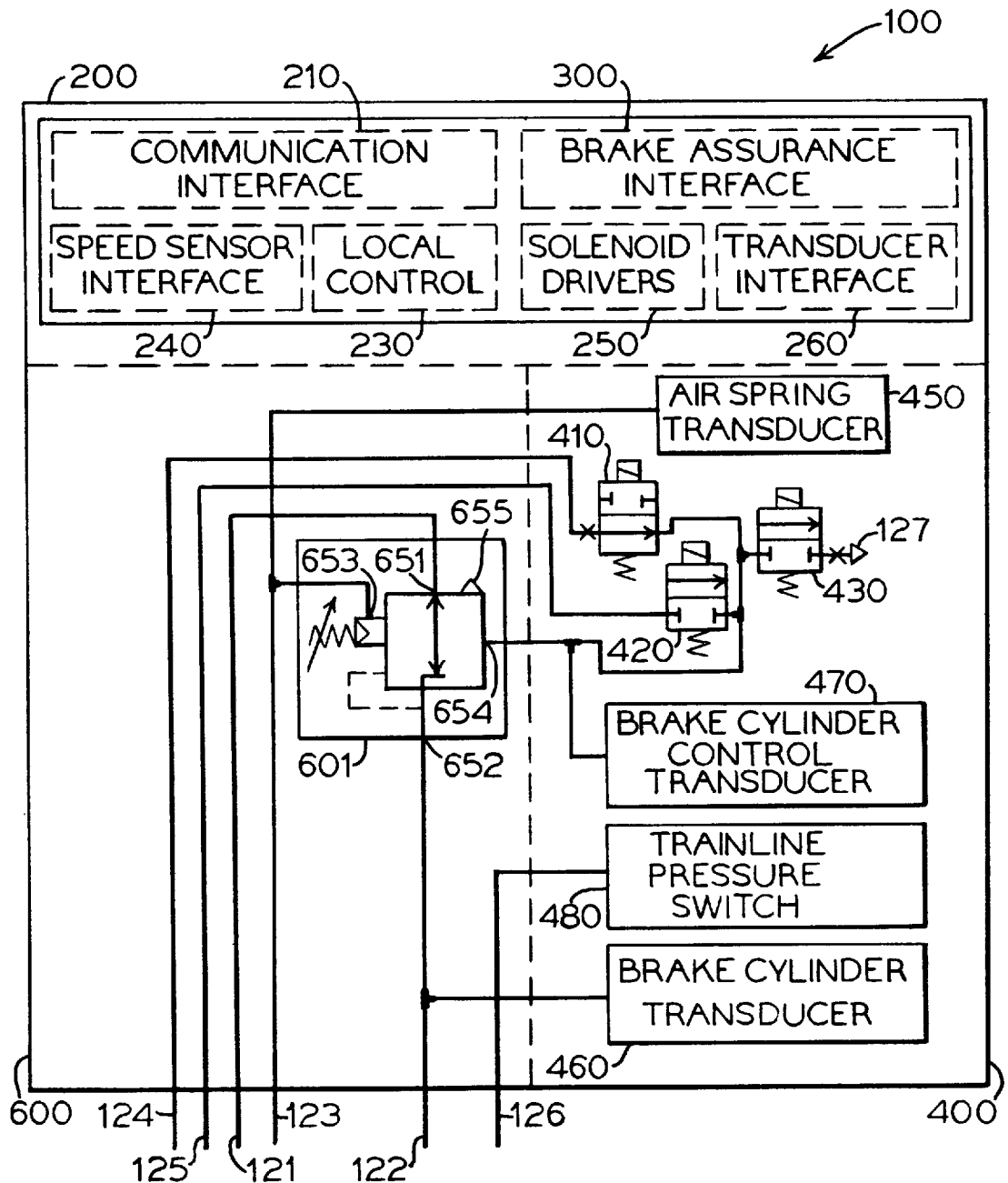
FIG. 2 is a schematic view of the universal brake control unit with which the present invention may cooperate.
Figure 3:
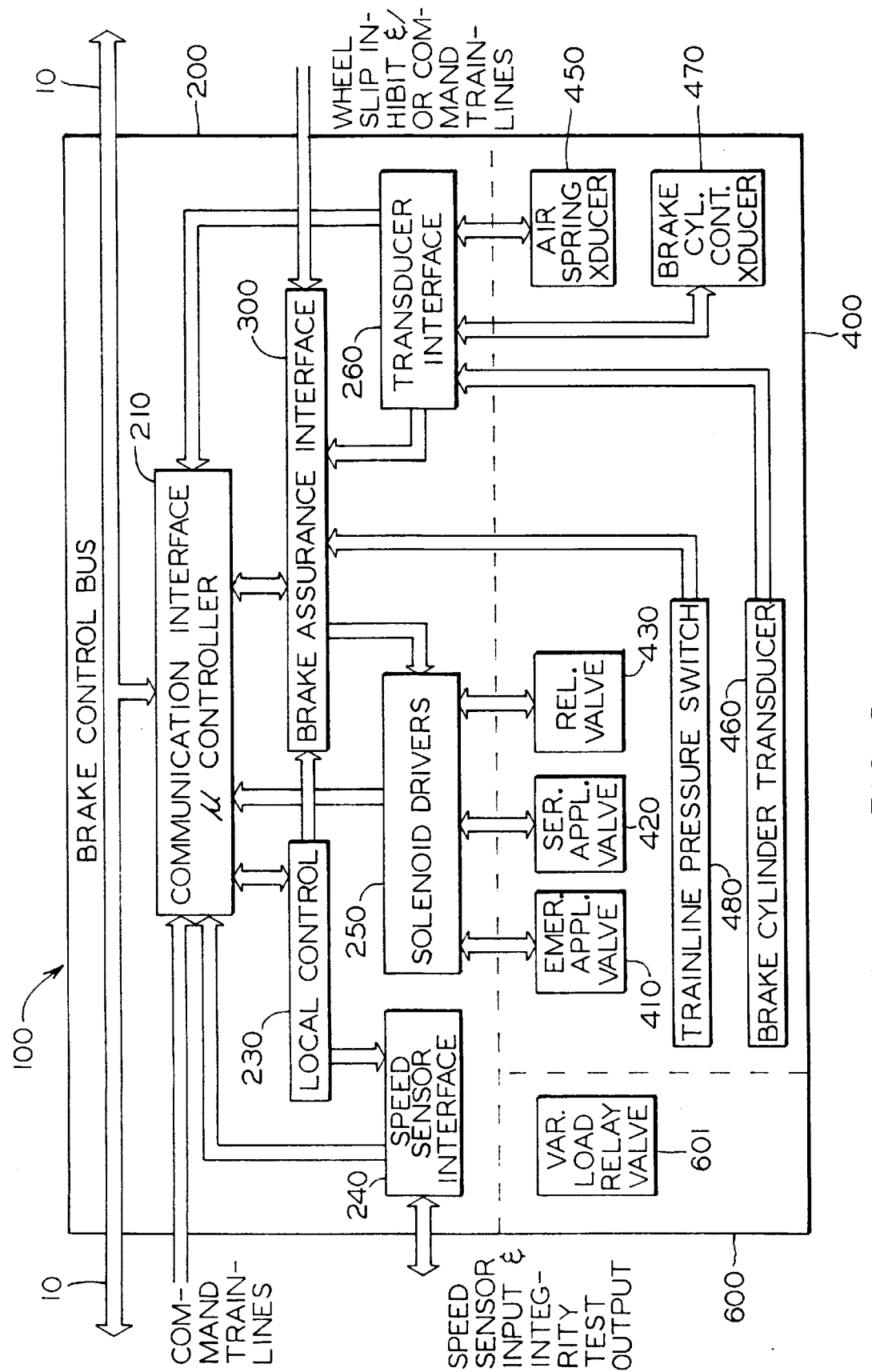
FIG. 3 is a schematic view of the universal brake control unit with which the present invention may cooperate.

Referring now to FIGS. 2 and 3, the universal unit 100 basically comprises an electronic section 200, an electropneumatic section 400 and a pneumatic section 600. The electronic section 200 includes a communication interface means 210, a local control means 230, a speed sensor interface means 240, a solenoid driver means 250, a transducer interface means 260 and a brake assurance interface means 300. The electropneumatic section 400 includes an emergency application valve (EAV) 410, a service application valve (SAV) 420 and a release valve (RV) 430 along with an air spring transducer (AST) 450, a brake cylinder transducer (BCT) 460, a brake cylinder control transducer (BCCT) 470 and a trainline pressure switch 480. The pneumatic section 600 features a variable load relay valve (VLRV) 601.

The universal unit 100 connects pneumatically within the RT-2 Brake Control System 1 through several ports as shown in FIGS. 1 and 2. The input ports of universal unit 100 include a relay valve supply port 121, an air spring supply port 123, an emergency application supply port 124, a service application supply port 125 and a trainline pipe port 126. The output ports include a brake cylinder output port 122 and an exhaust port 127. The air spring supply port 123 receives air spring pressure from an air suspension system (not shown) on the rail vehicle in a manner well known in the brake control art. The service application supply port 125 receives a first source of pressure. The emergency application supply port 124 receives a second source of pressure. Relay valve supply port 121 receives a third source of pressure.

From the perspective of the universal units 100 illustrated in FIG. 1, the SAP & BP control unit 900 basically serves as all of the sources of pressure in the RT-2 Brake Control System. The trainline pipe port 126 receives pressure from the brake pipe in the RT-2 System. The trainline or brake pipe pressure switch (BPPS) 480 monitors the pressure in the brake pipe 3. In a manner well known in the brake control art, when pressure in brake pipe 3 drops to an emergency level, the BPPS 480 generates an electrical signal indicative of an emergency. The BPPS passes this emergency signal to the brake assurance means 300 where it is used in an emergency as described below.

The variable load relay valve 601 is an air piloted device whose construction and operation are well known in the brake control art. The VLRV 601 may optionally be replaced by a combination consisting of a variable load valve and a J-1 relay valve both of which are also well known. The VLRV 601 includes a supply port 651 connected to the third source of pressure via relay valve supply port 121, an output port 652 connected to the brake cylinders via brake cylinder output port 122, and a load weight port 653 connected to the air suspension system via air spring supply port 123 and a brake control port 654 connected both to the outputs of the EAV 410 and SAV 420 and to the input of the RV 430. The VLRV 601 also includes an exhaust port 655 through which pressure from the brake cylinders vents to atmosphere when the pressure at brake control port 654 falls below a minimal level in a manner well known in the art. The SAV 420 when open allows a low capacity service brake control pressure to pass from the first source of pressure to brake control port 654. The EAV 410 when open allows a low capacity emergency brake control pressure to pass from the second source of pressure to brake control port 654.

The VLRV 601 responds to either low capacity brake control pressure by providing from output port 652 a high capacity pressure to the brake cylinders. Though the air supplied to the brake cylinders will obviously be provided in greater quantity than the air received at brake control port 654, the air delivered to the brake cylinders (i.e., brake cylinder pressure) and the air delivered to brake control port 654 (i.e., brake control pressures) will be approximately equal in pressure as long as the brake cylinder pressure is below the air spring pressure provided to load weight port 653. Brake cylinder pressure is thus proportional to pressure that the VLRV 601 receives from the air suspension system. The VLRV 601 thus uses air spring pressure to limit the maximum pressure at which air is directed to the brake cylinders. The VLRV 601 thus compensates for the weight of the load borne by the rail vehicle during both service and emergency brake applications.

Regarding the pressure transducers, the air spring transducer (AST) 450 monitors the air spring pressure at the load weight port 653 of the VLRV 601. The brake cylinder control transducer (BCCT) 470 monitors the brake control pressure at the brake control port 654 of the VLRV. The brake cylinder transducer (BCT) 460 monitors the pressure supplied to the brake cylinders from the output port 652 of the VLRV (i.e., the brake cylinder output port 122 of the universal unit).

The SAV, EAV and RV valves are each two-way magnet valves controlled by the electronic section 200 of universal unit 100 as indicated by FIGS. 2 and 3. The SAV 420 connects at its input port to the first source of pressure via the service application supply port 125 and at its output port connects to the brake control port 654 of the VLRV 601. The EAV 410 connects at its input port to the second source of pressure via the emergency application supply port 124 and at its output port to the brake control port 654 of the VLRV. The RV 430 connects at its input port to brake control port 654 and vents to atmosphere through its exhaust port 127.

The universal unit 100 connects electrically within the RT-2 Brake Control System 1 as best shown in FIG. 3. Each rail vehicle usually includes a master electronic unit (MEU) (not shown) The communication interface means 210 is the component through which universal unit 100 communicates with the MEU via a brake control bus 10 on the rail vehicle. The communication means 210 may take the form of any one of a variety of known devices used to communicate information between parts of an electronic system. Through brake control bus 10, the MEU communicates with and controls each of the universal units 100 on a given rail vehicle as explained below. Brake control bus 10 can be either an electronic or a fiber optic link and use any one of a variety of communication protocols known in the communication art.

The SAP & BP control unit 900 incorporates into the RT-2 Brake Control System 1 along with the universal units 100 as shown in FIG. 1. The SAP & BP control unit 900 includes a straight air pipe (SAP) port 901, a brake pipe (BP) port 902, a master output port 903, a command output port 904, a primary port 909 and a drain port 923. Regarding its pneumatic connections, SAP & BP control unit 900 connects to the straight air pipe 6 via SAP port 901 and to the brake pipe 3 via BP port 902. Master port 903 connects to supply reservoir 2 of the RT-2 System and to relay valve supply port 121 of each universal unit 100. Command port 904 connects to the emergency application supply port 124 and to the service application supply port 125 of each universal unit. Primary port 909 connects to main reservoir 8 of the RT-2 System, and drain port 923 connects to atmosphere.

Regarding its electrical connections, SAP & BP control unit 900 connects within brake control system 1 through its SAP transmission interface means 905. SAP transmission means 905 may be any one of a variety of known devices used to communicate information between parts of an electronic system. SAP transmission means 905 connects to the MEU via brake control bus 10.

The SAP & BP control unit includes the SAP transmission means 905, apply and release magnet valves (APP) 906 and (REL) 907, an SAP transducer (SAPT) 908, an emergency transfer valve (ETV) 910, a regulating valve 917 and a network N of pipes that serve as a common connection point as explained below. The APP and REL magnet valves 906 and 907 are each preferably controlled via an electrical trainline by the central controller of brake control system 1. The APP 906 connects at its input to straight air pipe 6 and at its output to pipe network N. Pipe network N allows the output of APP 906 to flow via one way check valve 922 and master port 903 to supply reservoir 2 and to relay valve supply port 121 of each universal unit 100. The REL 907 connects at its input to straight air pipe 6 and at its exhaust port to atmosphere. The SAPT 908 monitors straight air pipe 6 for the pneumatic brake command signal sent by brake control system 1. The SAPT 908 converts this pneumatic signal into an electrical signal and passes it to SAP interface means 905. SAP interface means 905 makes this electrical brake command signal available to the MEU and to any other devices on brake control bus 10.

The regulating valve 917 is an air piloted valve whose operation depends on the pressure applied to its regulating pilot port. The regulating valve 917 connects at its input to main reservoir 8 and at its output to its own regulating pilot port and to pipe network N. Straight air pipe 6 also connects via one way check valve 918 to pipe network N and the output of regulating valve 917. SAP & BP control unit 900 preferably includes a filter 919 in series between main reservoir 8 and the input to regulating valve 917 to remove particulate matter from the incoming air stream. The filter connects to a straight cut-out cock 920 from which air and the moisture it carries can be expelled from the unit via drain port 923. A vented cut-out cock 921 may also be placed in series between main reservoir 8 and filter 919.

The ETV 910 of SAP & BP control unit 900 is an air piloted valve whose operation depends on the pressure applied to its transfer pilot port. ETV 910 has three other ports: a stationary port, an emergency port and a standard port. The transfer pilot port is connected via BP port 902 to brake pipe 3. The stationary port is connected via command port 904 to the emergency and service application supply ports 124 and 125 of each universal unit 100. The emergency port is connected via pipe network N, regulating valve 917 and primary port 909 to main reservoir 8. The standard port is connected via SAP port 901 to straight air pipe 6.

As long as the pressure within brake pipe 3 exceeds a minimum level, ETV 910 connects the standard and stationary ports thereby connecting straight air pipe 6 to the emergency and service application supply ports 124 and 125. The minimum level is preferably preselected to be the pressure at which a request for emergency braking is made via brake pipe 3.

When the pressure within brake pipe 3 reaches or drops below the minimum level, ETV 910 as shown in FIG. 1 connects the emergency and stationary ports thereby connecting main reservoir 8 (via pipe network N and regulating valve 917) to the emergency and service application supply ports 124 and 125. While the pressure at its transfer pilot port stays at or below the minimum level, ETV 910 also connects the output of APP 906 (via pipe network N) to the emergency and service application supply ports 124 and 125.

The ETV 910 is the valve through which the first and second sources of pressure supply the inputs of EAV 410 and SAV 420 of each universal unit 100. Whether these two sources of pressure ultimately come from straight air pipe 6 or main reservoir 8 or both depends on the pressure that the transfer pilot port receives from brake pipe 3. When there is no request for emergency braking via brake pipe 3, ETV 910 supplies pressure from straight air pipe 6 to the magnet valves EAV 410 and SAV 420. When there is a request for emergency braking, ETV 910 supplies pressure from both main reservoir 8 and the output of APP 906 (via pipe network N) to those magnet valves.

The present invention 900 also includes brake pipe charging and emergency release valves (BP CHRG) 911 and (BP EMER REL) 912, a brake pipe maintaining valve (BP MAIN) 913, a VX vent valve 914 and two pressure switches 915 and 916. BP CHRG 911 connects at its input (via pipe network N and regulating valve 917) to main reservoir 8 and at its output to brake pipe 3. BP EMER REL 912 connects at its input to brake pipe 3 and at its exhaust port to atmosphere.

The BP MAIN 913 is an air piloted valve whose operation depends on the pressure applied to its main pilot port. The main pilot port is connected to brake pipe 3. Like BP CHRG 911, BP MAIN 913 connects at its input (via pipe network N and regulating valve 917) to main reservoir 8 and at its output to brake pipe 3. As long as the pressure at its main pilot port stays at or exceeds a minimum threshold, BP MAIN 913 connects its input and output ports thereby connecting (via a choke) main reservoir 8 to brake pipe 3. When the pressure at the main pilot port falls below the threshold, BP MAIN 913 disconnects main reservoir 8 from brake pipe 3.

From the foregoing and FIG. 1, it should be apparent that pipe network N basically interconnects the output of APP 906, the emergency port of ETV 910, the output of regulating valve 917 and the inputs to BP CHRG 911 and to BP MAIN 913. Pipe network N also connects to straight air pipe 6 via one way check valve 918. Pressure from main reservoir 8 is available to pipe network N via primary port 909 and regulating valve 917. Pipe network N connects to master port 903 via one way check valve 922.

The VX vent valve 914 is an air piloted valve whose operation and construction are well known in the brake control art. VX vent valve 914 includes two pilot ports and an exhaust port. Its operation depends on the difference in pressure applied to its two pilot ports. The first pilot port receives pressure from a control volume while the second pilot port receives pressure from brake pipe 3 via BP port 902. The control volume charges with air received from brake pipe 3. If the pressure in brake pipe 3 drops at a slow enough rate, VX vent valve 914 will bleed the pressure contained in the control reservoir through a choke into brake pipe 3. If pressure in brake pipe 3 drops quickly enough (i.e., faster than a predetermined rate), VX vent valve 914 allows pressure in brake pipe 3 to vent quickly to atmosphere via its exhaust port. This quickly decreases pressure in brake pipe 3 so as to assist in propagating the request for emergency braking throughout the train.

One of the pressure switches (LBPPS) 915 is set to close when pressure in the brake pipe reaches or exceeds a preset low pressure. The other pressure switch (HBPPS) 916 is set to close when pressure in the brake pipe reaches or exceeds a preset high pressure. The preset low pressure is preferably set to a level that indicates that the brake pipe is indeed being charged and that there is continuity in the brake pipe throughout the train. The preset high pressure is preferably set to a level (e.g., 85–90 psi) higher than to what BP MAIN 913 reacts. LBPPS 915 when closed connects a charging trainline from brake control system 1 to the coil of BP CHRG 911. The charging trainline typically carries power only when a manually operated button on the cab control unit/central controller is pressed. HBPPS 916 when closed preferably energizes some sort of indicator in the cab. HBPPS 916 can thus be used as part of a circuit through which to inform the train operator that the brake pipe is indeed fully charged or at least approaching fully charged.

BP CHRG 911, BP MAIN 913 and BP EMER REL 912 work cooperatively with each other to charge, maintain or reduce pressure in brake pipe 3 according to commands received from brake control system 1. BP CHRG 911 is a normally deenergized (closed) valve which in the absence of an emergency braking request can be opened via the charging trainline when LBPPS 915 is closed and the manually operated button is pressed. When open, BP CHRG 911 allows pressure via pipe network N and BP port 902 to charge brake pipe 3. BP EMER REL 912 is a normally deenergized (closed) valve which can be opened via an emergency release trainline. BP EMER REL 912 typically should be energized at the same time that the brake control system sends the emergency brake request along brake pipe 3 to each rail vehicle in the train. When open, the BP EMER REL 912 on each rail vehicle allows pressure in brake pipe 3 to vent to atmosphere. BP EMER REL 912 is the valve at the rail vehicle level that assists in quickly reducing pressure in brake pipe 3 throughout the train.

The BP MAIN 913, BP CHRG 911 and BP EMER REL 912 valves and associated pressure switches essentially serve a protective function within the brake control system in which SAP & BP control unit 900 is incorporated. Before the train departs from a stop, for example, brake control system 1 begins charging brake pipe 3 so as to release the brakes on each of the rail vehicles of the train. In each rail vehicle, when pressure in brake pipe 3 reaches or exceeds the preset low pressure, the LBPPS 915 closes thereby enabling brake control system 1 to energize BP CHRG 911 via the charging trainline. When LBPPS 915 is closed and the manually operated button is pressed, BP CHRG 911 opens thereby allowing pressure via pipe network N to charge brake pipe 3. The BP CHRG 911 in each rail vehicle thus assists in quickly increasing pressure in brake pipe 3 and releasing the brakes.

Once the train operator concludes that pressure in brake pipe 3 has reached a satisfactory level (e.g., 75–90 psi) via a gage or other device, the operator will release the button thereby closing BP CHRG 911 and preventing further flow of pressure via pipe network N through BP CHRG 911 to brake pipe 3. The satisfactory level at which the operator may release the button is preferably set at least at the minimum threshold of BP MAIN 913. This assures that BP MAIN 913 can perform its maintaining function and pressure in brake pipe 3 will not again drop unintendedly.

Once brake pipe 3 has charged to the satisfactory level and BP CHRG 911 closes, the BP MAIN 913 should be able to maintain pressure within the brake pipe. As long as the pressure at its main pilot port stays at or exceeds a minimum threshold, BP MAIN 913 via the choke maintains the flow of pressure from main reservoir 8 to brake pipe 3. BP MAIN 913 thus maintains more or less a full release pressure level (e.g., 110 psi) within brake pipe 3 as long as the pressure at its main pilot port remains at or above the minimum threshold. Should the pressure at its main pilot port drop below the minimum threshold, BP MAIN 913 disconnects main reservoir 8 from brake pipe 3. The BP MAIN valve 913 thus maintains pressure in the brake pipe to offset minor leakage.

The operation of VX vent valve 914, unlike BP MAIN 913, depends upon the rate at which the pressure drops within brake pipe 3. Should pressure within the brake pipe drop precipitously (i.e., faster than the predetermined rate), VX vent valve 914 allows pressure in brake pipe 3 to vent quickly to atmosphere via its exhaust port in the manner indicated previously. If the pressure in brake pipe 3 drops rapidly enough, even if it is still above the minimum threshold of BP MAIN 913, BP MAIN 913 cannot maintain pressure within brake pipe 3 due to the limited rate at which air can flow through its choke and the much faster rate at which the pressure is dropping in the brake pipe via vent valve 914. Once pressure at its main pilot port descends to or below the minimum threshold, BP MAIN 913 closes thereby preventing flow of air from main reservoir 8 into brake pipe 3. The VX vent valve 914 thus quickly decreases pressure in brake pipe 3 so as to assist in propagating the request for emergency braking throughout the train.

It should be apparent to persons skilled in the brake control art that the SAP & BP control unit may conceivably be employed on brake control systems other than the RT-2 System discussed above. Obvious modifications may be necessary, though, such as changing the manner in which the unit connects to the brake control system. This would, of course, depend upon the specific application in which the invention is employed.

The SAP & control unit 900 and the universal units 100 work in tandem to assure proper operation of the brakes of each truck in the rail vehicle in which they are installed. The MEU controls the magnet valves of each universal unit 100 through which air received from the first and second sources of pressure can flow. By controlling these magnet valves and thus the control pressure that may be applied to brake control port 654 of VLRV 601, the MEU affects how pressure received from the third source of pressure is conveyed by each universal unit 100 to the brake cylinders of its truck. It is the SAP & BP control unit that is the conduit for or the provider of all the sources of pressure in the RT-2 Brake Control System.

SAP & BP control unit 900 operates in response both to pressure within straight air pipe 6 and to commands that APP and REL valves 906 and 907 receive via trainlines from the central controller of brake control system 1. Specifically, in response to movement of the brake handles, the RT-2 System through its central controller (not shown) sends the corresponding brake command signal pneumatically along straight air pipe 6 to each rail vehicle in the train. Pressure within straight air pipe 6 varies according to the particular service braking request or release braking request (i.e, no pressure) it carries.

SAP & BP control unit 900 receives pressure from straight air pipe 6 via SAP port 901 at the standard port of ETV 910 and at SAPT 908. When no emergency braking request from brake pipe 3 (i.e., high pressure) is applied to its transfer pilot port, ETV 910 allows pressure from straight air pipe 6 to flow via its standard and stationary ports to the magnet valves EAV 410 and SAV 420. When an emergency braking request is received (i.e., low pressure), ETV 910 allows pressure from main reservoir 8 to flow via its emergency and stationary ports to those magnet valves. ETV 910 is thus the valve through which SAP & BP control unit 900 (via command port 904) provides the first and second sources of pressure to each universal unit 100. Whether or not there is a request for emergency braking, SAPT 908 converts the pressure within straight air pipe 6 (i.e., pneumatic brake command signal) into an electrical signal which it passes to SAP transmission means 905. Through SAP transmission means 905, SAP & BP control unit 900 makes this brake command signal available to the MEU which performs the Brake Control Process described below.

Regarding how the SAP & BP control unit operates in response to a request for a release of brakes, the RT-2 System orders a release of the brakes on each rail vehicle by sending a release braking request along straight air pipe 6 and by maintaining pressure within brake pipe 3 at the full release level. With high pressure (i.e., no emergency braking request) applied to its transfer pilot port, ETV 910 allows communication between its standard and stationary ports. Even though ETV 910 would allow it, no pressure will flow from straight air pipe 6 to magnet valves EAV 410 and SAV 420 because the release braking request implies virtually no pressure within straight air pipe 6. As explained below, local control means 230 would simultaneously command the EAV and SAV magnet valves closed so as to prevent air from SAP and BP control unit 900 from reaching brake control port 654 of VLRV 601. Without brake control pressure at its brake control port 654, VLRV 601 will not pass pressure via its supply port 651 from main reservoir 8 and supply reservoir 2 to the brake cylinders.

Coincident with sending the release braking request along straight air pipe 6, the central controller of the RT-2 System via a release trainline also energizes (opens) the REL magnet valve 907 in SAP & BP control unit 900. APP magnet valve 906 meanwhile is kept in its normally deenergized (closed) state via an application trainline. Any pressure within straight air pipe 6 then flows through REL valve 907 to atmosphere. REL valve 907 when open thus assists in decreasing pressure in straight air pipe 6 and in releasing the brakes.

It should be apparent that one way check valve 922 prevents air stored within supply reservoir 2 from flowing to atmosphere even though REL valve 907 is open, no matter the state of APP valve 906. One way check valve 918 likewise prevents air from flowing from main reservoir 8 (via regulating valve 917) through REL 907 to atmosphere but allows pressure from straight air pipe 6 to flow to pipe network N. Should a service or emergency braking request suddenly be made, supply reservoir 2 and main reservoir 8 act as the third source of pressure for supply port 651 of variable load relay valve 601 of each universal unit 100.

Regarding how the SAP & BP control unit operates in response to a service braking request, the RT-2 System orders an application of the brakes on each rail vehicle by sending the service braking request along straight air pipe 6 and, if no emergency braking request is made, by maintaining pressure within brake pipe 3 at the full release level. With high pressure applied to its transfer pilot port, ETV 910 allows communication between its standard and stationary ports. Pressure will flow from straight air pipe 6 to magnet valves EAV 410 and SAV 420 because the service braking request implies pressure within straight air pipe 6. Under these conditions, straight air pipe 6 (via command port 904) acts as the first and second sources of pressure for the EAV and SAV valves 410 and 420 of each universal unit 100.

Coincident with sending the service braking request along straight air pipe 6, the central controller of the RT-2 System via the application trainline also energizes (opens) the APP magnet valve 906. REL magnet valve 907 meanwhile is kept in its normally deenergized (closed) state. Pressure within straight air pipe 6 then flows through APP valve 906 via check valve 922 to both supply port 651 of each universal unit 100 and supply reservoir 2. Pressure from straight air pipe 6 also flows through APP valve 906 via pipe network N to the emergency port of ETV valve 910 and to the input ports of BP CHRG 911 and BP MAIN 913. Under these conditions, straight air pipe 6 and main reservoir 8 (via master port 903) as well as supply reservoir 2 act as the third source of pressure for supply port 651 of VLRV 601 of each universal unit.

The local control means 230 would simultaneously command the SAV magnet valve open so as to allow air from SAP and BP control unit 900 to reach brake control port 654 of VLRV 601. With this service brake control pressure at its brake control port 654, VLRV 601 will pass pressure via its supply port 651 from the third source of pressure to the brake cylinders as explained below.

Regarding how the SAP & BP control unit operates in response to an emergency braking request, the RT-2 System orders an application of the brakes on each rail vehicle by sending the emergency braking request along brake pipe 3 and the service braking request along straight air pipe 6. With low pressure (i.e., an emergency braking request) applied to its transfer pilot port, ETV 910 allows communication between its emergency and stationary ports. Pressure will flow from main reservoir 8 (via regulating valve 917 and pipe network N) through ETV 910 via command port 904 to magnet valves EAV 410 and SAV 420.

Coincident with sending the emergency braking request along brake pipe 3, the central controller of the RT-2 System may also energize (open) the APP magnet valve 906. REL magnet valve 907 is kept in its normally deenergized (closed) state. Pressure within straight air pipe 6 then flows through APP valve 906 (via pipe network N and ETV 910) to magnet valves EAV 410 and SAV 420. (Pressure also flows through APP valve 906 via pipe network N to the input ports of BP CHRG 911 and BP MAIN 913.) Pressure within straight air pipe 6 also flows through APP valve 906 via check valve 922 both to supply port 651 of each universal unit 100 and to supply reservoir 2. Under these conditions, main reservoir 8 and straight air pipe 6 (via command port 904) act as the first and second sources of pressure for the EAV and SAV valves 410 and 420 of each universal unit 100. Straight air pipe 6 and main reservoir 8 (via master port 903) as well as supply reservoir 2 act as the third source of pressure for supply port 651 of VLRV 601 of each universal unit 100.

The local control means 230 would simultaneously command both the EAV and SAV valves open so as to allow air from SAP and BP control unit 900 to reach brake control port 654 of VLRV 601. With at least the emergency brake control pressure at its brake control port 654, VLRV 601 will pass pressure via its supply port 651 from the third source of pressure to the brake cylinders as explained below.

SAP & BP control unit 900 and the universal units 100 thus work in tandem to assure proper operation of the truck brakes on the rail vehicle in which they are installed. The MEU receives not only the brake command signal from SAP & BP control unit 900 but also various other signals from other parts of brake control system 1. It is through these signals that the MEU initiates the control of the brakes on each truck on the rail vehicle according to the Brake Control Process depicted in blocks 1–15A and 15B of FIGS. 4A and B.

Figure 4A:
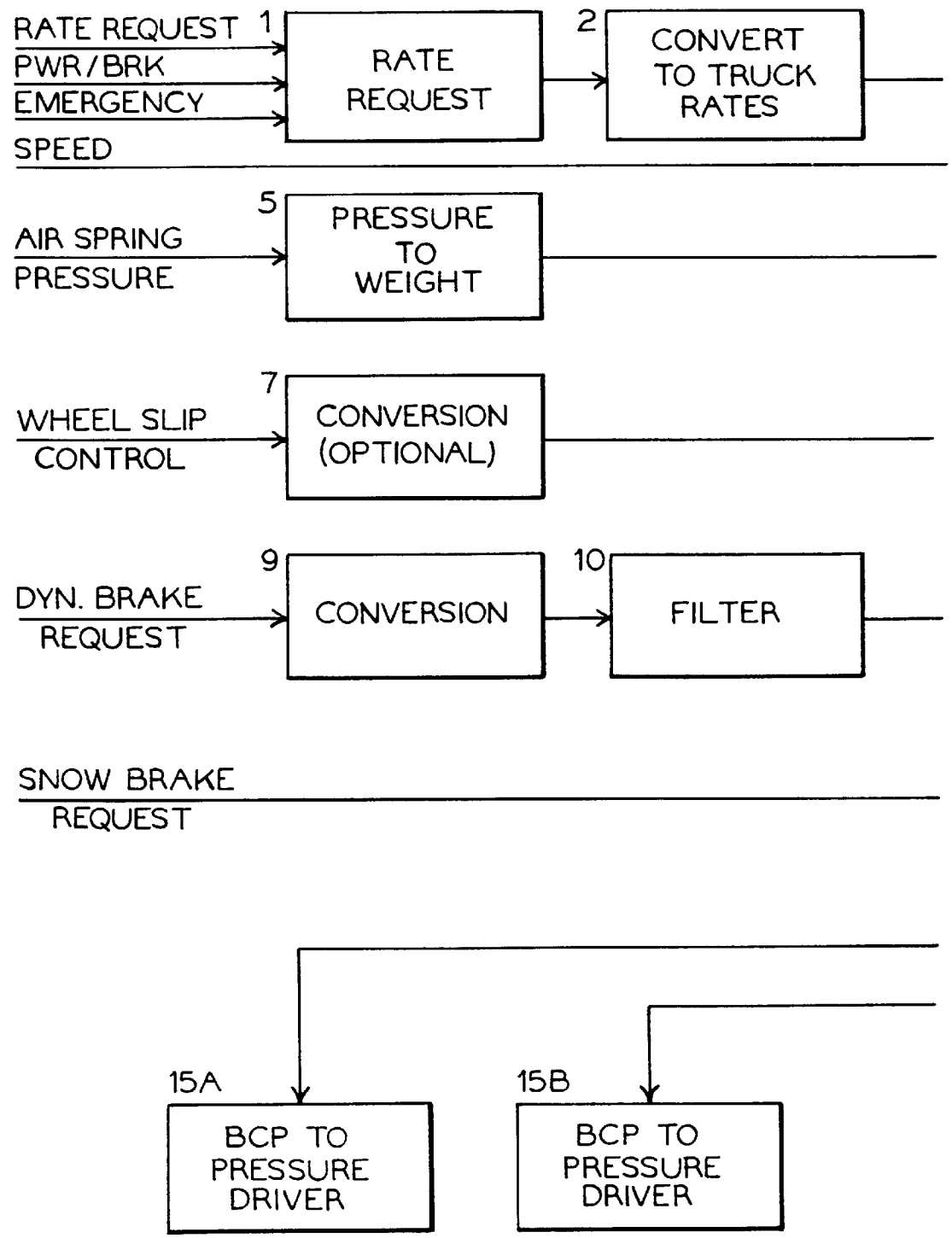
FIG. 4A and B are is a block diagram that illustrates a brake control process.
Figure 4B:
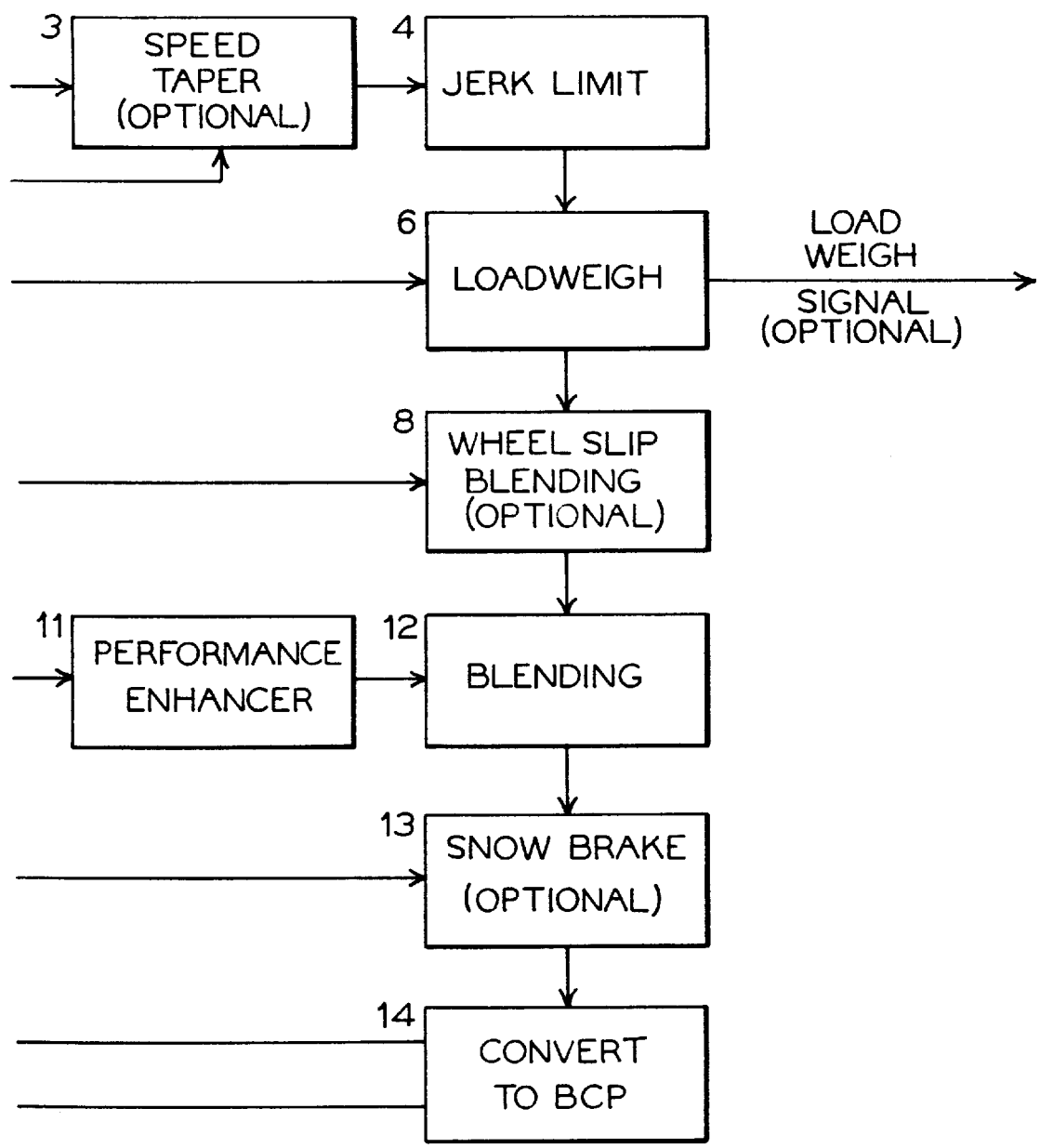

This Brake Control Process is somewhat different than the prior art brake control process described in the background, especially as it pertains to the functions illustrated in blocks 15A and 15B. As shown in FIGS. 4A and B, the MEU receives various signals and determines a brake force command signal according to principles well known in the brake control art. The brake force command signal is an electrical signal ultimately indicative of the pressure that ought to be supplied to the brake cylinders of each truck. It is communicated to each universal unit as indicated in blocks 15A and 15B.

The MEU, for example, reads the rate request signal, the power/brake signal and the emergency brake signal received from the brake control system as shown in block 1. In RT-2 Brake Control System illustrated in FIG. 1, the brake command signal (i.e., rate request signal) is the service or release braking request conveyed along straight air pipe 6 to SAPT 908 to the MEU. The emergency brake signal is the emergency braking request conveyed along brake pipe 3 to BPPS 480 to brake assurance means 300 ultimately to the MEU. Depending on the particular system in which the present invention is employed, the rate request signal may be representative not only of the brake command signal but also the rate at which to propel the rail vehicle during propulsion. In the RT-2 System, however, the rate request signal represents the brake command signal. As is known in the art, the power/brake signal is used in conjunction with the rate request signal to distinguish whether the train is in the braking mode or the propulsion mode.

Block 1 of the Brake Control Process illustrates that the MEU uses these signals to determine the rate at which the entire train is to be braked, i.e., train braking rate request (in mphps). Block 2 illustrates that the MEU converts the train braking rate request into the rates at which the brakes on the truck of the rail vehicle are to be braked, i.e., the truck braking rate request (in mphps). The truck braking rate request represents the amount of braking force that should be applied by the brakes of each truck.

The MEU may also process other signals such as a speed signal, an air spring pressure signal, a dynamic brake feedback signal, a snow brake request signal and a wheel slip control signal. Block 3 of the Brake Control Process illustrates that the MEU may use the speed signal to perform speed tapering, an optional feature of the Brake Control Process. Speed tapering can be employed at speeds above a predetermined level to lower the rate of braking on each rail vehicle. This would decrease the likelihood of wheel slippage and reduce thermal loading on the brakes. The output of block 3 is a modified truck braking request. Block 4 represents jerk limiting through which to reduce the jerking that would otherwise be encountered with quick acceleration or braking. The rate at which the truck brakes are applied or the rate at which the rail vehicle is accelerated may be limited to the preset jerk limit (mphpsps).

Blocks 5 and 6 of the Brake Control Process show that the air spring pressure signal may be used to modify the jerk limited truck braking request so as to compensate for the weight borne by the rail vehicle during brake applications. Based on rail vehicle weight and the jerk limited truck braking request, the MEU calculates the required friction tractive effort to be applied by the brakes of each truck as indicated by block 6. Block 7 and 8 show that the wheel slip control can be used to reduce the friction tractive effort in response to wheel slippage. Blocks 9–12 show that the friction tractive effort may be further reduced by the amount of dynamic braking effort provided by the propulsion units.

Block 13 illustrates that the MEU may also take into account the snow brake request, i.e., the signal that represents the small amount of braking force that may be applied to the railcar wheels to prevent build up of ice and/or snow. The MEU may further reduce the friction tractive effort to account for the snow braking effort already applied to the wheels. The output of block 13 represents the final braking effort to be applied to the wheels of each truck.

Block 14 illustrates that the MEU converts the final friction braking effort into an electrical signal indicative of brake cylinder pressure. Equivalent to the final braking effort, the brake cylinder pressure signal represents the amount of pressure that ought to be supplied to the brake cylinders of each truck of the rail vehicle. Blocks 15A and 15B each convert the brake cylinder pressure signal into the type of voltage or current signal that can be processed by each of the universal units 100 on the rail vehicle. This signal, called the brake force command signal, is sent to each universal unit 100 as shown in blocks 15A and 15B. Each universal unit, rather than the MEU, separately controls the brakes on its truck as explained below.

It should be apparent to persons skilled in the brake control art that each universal unit 100 rather than the MEU could perform part or all of the Brake Control Process in addition to those tasks described below. The various signals needed to perform the process would be conveyed directly or indirectly to universal unit 100 via the trainlines or other means as shown in FIG. 3. The MEU could then serve as a backup or perform more of a communication function or other desired tasks or both. Obvious modifications may be necessary, though, depending upon the specific application in which the universal unit is employed.

Referring now to FIGS. 2 and 3, the MEU sends the brake force command signal to the communication interface means 210 of each universal unit 100 on the rail vehicle. Communication means 210 conveys the brake force command signal to local control means 230. Local control means 230 is basically a computing device through which universal unit 100 controls its magnet valves (i.e., the RV, SAV and EAV) during most conditions as explained below. Specifically, in response to the brake force command signal, local control means 230 generates valve command signal(s) to direct solenoid driver means 250 to energize the appropriate magnet valve(s). For reasons that will soon be apparent, the valve commands sent from local control means 230 to solenoid driver means 250 are routed through brake assurance means 300.

The brake force command signal can also be referred to as a command for brake control pressure because it represents the pressure that should be supplied to the brake control port 654 of VLRV 601. The brake force command signal, of course, is also ultimately indicative of the pressure that should be supplied to the brake cylinders of each truck. Local control means 230 receives not only the command for brake control pressure but also feedback in the form of a brake control pressure feedback signal. The brake control pressure feedback signal is indicative of the pressure currently at brake control port 654 of VLRV 601. It is sent from the BCCT 470 via transducer interface means 260 and communication interface means 210.

The local control means basically determines which if any of the control pressures from SAP & BP control unit 900 (via command port 904) reaches brake control port 654 of VLRV 601. Local control means 230 executes a summing point function through which it compares the command for brake control pressure received ultimately from the MEU with the brake control pressure feedback signal received ultimately from BCCT 470. If the brake control pressure feedback signal represents a pressure greater than that represented by the command for brake control pressure, local control means 230 will command solenoid driver means 250 to open RV 430 to reduce the pressure at brake control port 654 to the desired level. Simultaneously, local control means 230 may also command solenoid driver means 250 to put both EAV 410 and SAV 420 in the closed state. EAV 410 and SAV 420 would thus prevent control pressure from SAP & BP control unit 900 from affecting brake control port 654. If the brake control pressure feedback signal represents a pressure whose value lies within a preset band around that represented by the command for brake control pressure, local control means 230 will command solenoid driver means 250 to maintain the pressure currently prevailing at brake control port 654. Solenoid driver means 250 will thus direct each of the magnet valves to a state appropriate to keep the pressure at brake control port 654 constant. If the brake control pressure feedback signal represents a pressure less than that represented by the command for brake control pressure, the local control means will command the solenoid driver means to deenergize (open) either or both of the SAV and EAV valves to increase the pressure at brake control port 654. Simultaneously, local control means 230 will also command the solenoid driver means to direct the RV to its normally closed (deenergized) state. This allows the appropriate brake control pressure to build at brake control port 654 of VLRV 601.

The VLRV responds to either brake control pressure by providing a corresponding pressure to the brake cylinders that is proportional to pressure that VLRV 601 receives from the air suspension system. This yields a final friction braking effort to the wheels of the truck that compensates for the weight of the load borne by the rail vehicle. Local control means 230 responds in this manner continuously to both the command for brake control pressure and the brake control pressure feedback signal as these commands are obviously subject to continuous change.

The local control means may also perform certain other tasks which can be performed according to principles well known in the brake control art. For example, local control means 230 can be used to determine whether the speed sensors are operating properly. This includes determining whether any discontinuities have developed in the associated wiring. It does this through a speed sensor test signal which it sends via the speed sensor interface means 240 to each speed sensor located on the axles of the truck. The result signal generated by each speed sensor in response to the test signal is compared to the test signal. The speed sensors operate properly if each result signal comports with the test signal. Whatever the result of the comparison, local control means 230 sends a diagnostic message indicative of the state of each speed sensor to communication means 210. It is through communication means 210 that universal unit 100 can make the diagnostic message available to any other devices on brake control bus 10. The system may be configured so that either the MEU commands local control means 230 to check the operation of the speed sensors or that local control means 230 does so unilaterally.

Each truck axle is equipped with a speed sensor as is well known in the brake control art. The speed sensor interface means 240 receives input from these speed sensors and converts them into signals indicative of speed and the rate at which the rail vehicle is accelerating or decelerating. Speed sensor means 240 sends these speed and accel/decel signals to communication means 210 through which universal unit 100 can make them available to other devices on brake control bus 10 including the MEU and the brake assurance means 300 as discussed in greater detail below. The MEU may use the speed signal (e.g., in speed tapering) and the accel/decel signal (e.g., in jerk limiting) to calculate the final friction braking effort according to the Brake Control Process outlined in FIGS. 4A and B.

The transducer interface means performs tasks which can be performed according to principles well known in the brake control art. Specifically, transducer interface means 260 supplies power to each of the transducers in the universal unit such as the brake cylinder transducer (BCT) 460, the brake cylinder control transducer (BCCT) 470 and the air spring pressure transducer (AST) 450. The BCT supplies an electrical brake cylinder pressure feedback signal indicative of the pressure supplied to the brake cylinders of the truck. The BCCT supplies the electrical brake control pressure feedback signal indicative of the pressure applied to brake control port 654 of the VLRV. The AST 450 supplies the electrical air spring pressure signal indicative of the air spring pressure that it receives from the air suspension system. Transducer interface means 260 conditions these signals and sends one or more of them to brake assurance means 300 and to communication means 210. Through communication means 210 universal unit 100 can make these signals available to any of its components or to any other devices on brake control bus 10 including the MEU.

The solenoid driver means contains the solenoid driver circuits responsible for driving the EAV 410, SAV 420 and RV 430 magnet valves. These driver circuits receive the valve command signals from local control means 230 through which it drives these magnet valves. The valve command signals from local control means 230 are allowed to pass through brake assurance means 300 to solenoid driver means 250 during normal operating conditions. If the brakes do not apply during normal service or emergency braking, brake assurance means 300 will interrupt all communication between local control means 230 and solenoid driver means 250 so that only brake assurance means 300 can control the magnet valves as explained below.

During normal service or emergency braking, when solenoid driver means 250 receives a release valve command signal from local control means 230, it opens the RV to reduce the pressure at brake control port 654 of VLRV 601. It may also simultaneously command the SAV and EAV valves to a closed state. EAV 410 and SAV 420 would thus prevent control pressure from SAP & BP control unit 900 from affecting brake control port 654. When solenoid driver means 250 does not receive a service valve command signal from local control means 230, it deenergizes (opens) the SAV to increase the pressure at brake control port 654. It also simultaneously directs the RV to its normally closed state and may also direct the EAV to its closed (energized) state. SAV 420 thus allows service brake control pressure from SAP & BP control unit 900 to build at brake control port 654. When solenoid driver means 250 does not receive an emergency valve command signal from local control means 230, it deenergizes (opens) the EAV to increase the pressure at brake control port 654. It also simultaneously directs the RV to its normally closed state. EAV 410 thus allows emergency brake control pressure from SAP & BP control unit 900 to build at brake control port 654. Variable load relay valve 601 responds to each brake control pressure in the previously described manner.

The solenoid driver means also performs certain other tasks which can be performed according to principles well known in the brake control art. For example, feedback from the coils of each of the two-way valves may be supplied to solenoid driver means 250 and passed to communication means 210 of universal unit 100 as shown in FIG. 3. Universal unit 100 can make these valve feedback signals available to any of its components or to any other devices on brake control bus 10.

The valve feedback signals may be used by the overall system in any number of ways. They may, for example, be used for diagnostic purposes to determine whether any one or more of the magnet valves actually responded to the valve command signals issued by local control means 230. Specifically, from the valve feedback signals the MEU could determine whether the magnet valves correctly responded to the command for brake control pressure (i.e., brake force command signal) it sent to local control means 230. If the valve feedback signals do not comport with the brake force command signal issued by the MEU, the MEU can pass a diagnostic or status message indicative of valve malfunction or other failure to the central controller of the brake control system into which the present invention is incorporated. The central controller can, of course, be programmed to react in whatever manner the train authority deems appropriate. Through a visual or audio indication, for example, the brake control system can at a minimum inform the train operator of the exact nature of the problem.

Figure 5A:
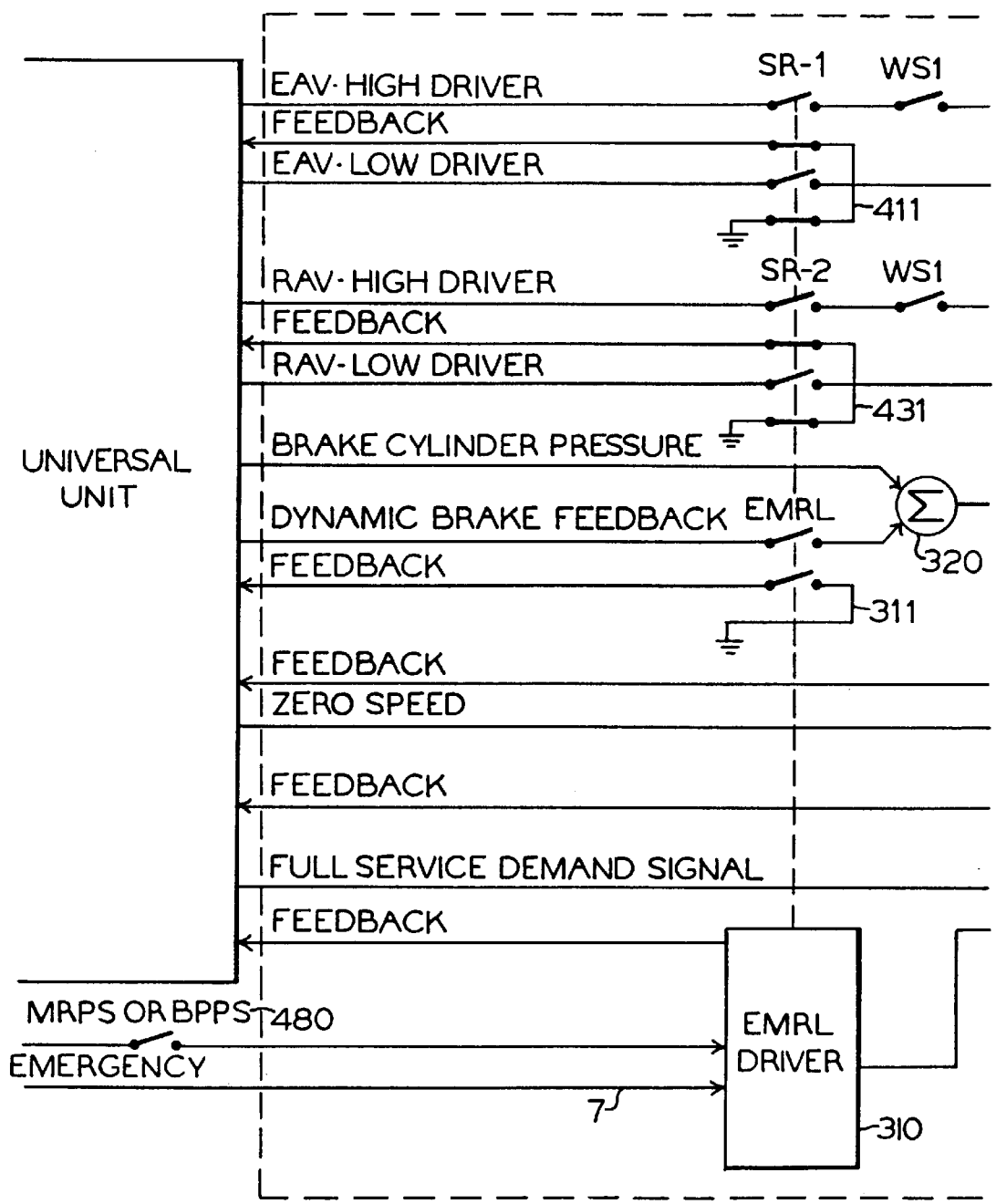
FIG. 5A and B are is a schematic view of a brake assurance module of the universal brake control unit shown in FIGS. 2 and 3.

Referring now to FIGS. 5A and B, brake assurance means 300 includes logic OR and AND gates 301 and 302, an emergency relay (EMRL) driver 310, emergency (EMRL) contacts, a summing circuit 320, a level detector circuit 330, a delay circuit 340, a timer circuit 350, a valve relay driver 360 and normally open solenoid relay contacts SR1 and SR2. The primary inputs to brake assurance means 300 are the full service demand signal and the emergency signal. These signals are supplied by the brake control system.

The full service demand signal merely represents the particular brake command signal (i.e., service braking request) through which the brake control system requests full application of the brakes. The full service demand signal may be routed to brake assurance means 300 in any number of ways. In the RT-2 System, for example, it may be conveyed via straight air pipe 6 to SAPT 908 of SAP & BP control unit 900. SAPT 908 conveys it electrically to SAP transmission means 905. SAP transmission means 905 then makes it available to the MEU which passes it via brake control bus 10 to communication means 210 and ultimately into brake assurance means 300.

Figure 5B:
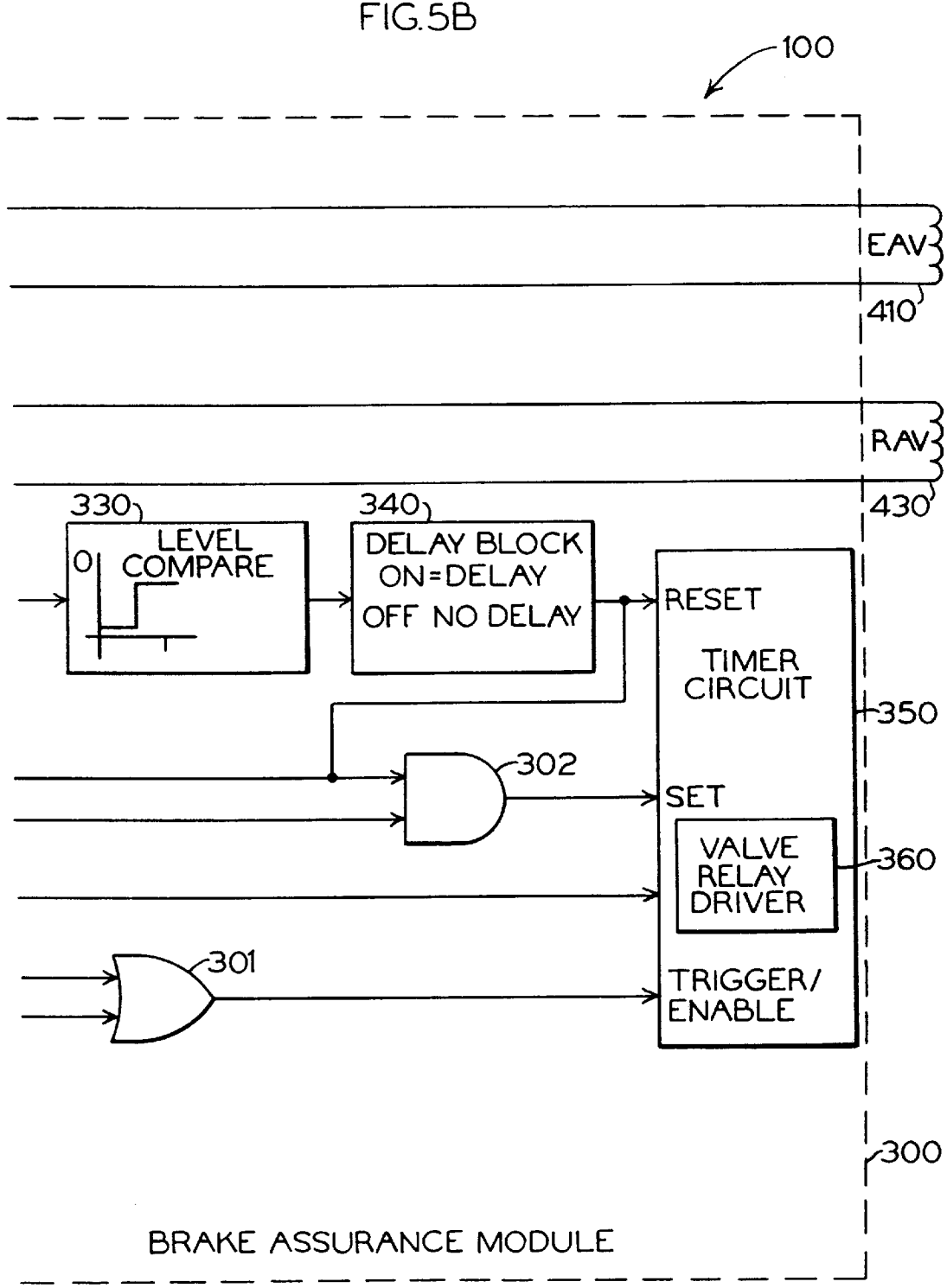

The EMRL driver 310 of brake assurance means 300 receives the emergency signal from the brake control system. Typically, the emergency signal is routed via (1) an electrical trainline 7 directly into brake assurance means 300 or (2) a pneumatic trainline into a pressure switch and then into the brake assurance means. In the RT-2 Brake Control System, for example, the central controller would pneumatically send the emergency brake signal (i.e., emergency braking request) along brake pipe 3. When pressure in brake pipe 3 drops to an emergency level, the BPPS 480 of each universal unit 100 generates an electrical signal indicative of the emergency. The BPPS 480 then passes this electrical signal to brake assurance means 300. The EMRL driver 310 reduces the voltage level of this electrical signal so that it is made compatible with the logic circuitry of brake assurance means 300. EMRL driver 310 also feeds back the resulting logic emergency detect signal to communication means 210 as is shown in FIGS. 3, 5A and 5B. Both the full service demand signal and the emergency detect signal are applied to the input of OR gate 301 whose output is fed into the trigger/enable input of timer circuit 350. The full service demand signal, of course, may or may not be used in this arrangement.

The summing circuit 320 receives the brake cylinder pressure signal via a first feed line and the dynamic brake feedback signal via a second feed line and sums these signals into a total braking effort signal. The former signal comes from the BCT 460 via transducer interface means 260 and represents the actual friction braking effort of the brakes of the truck. The latter signal ultimately comes from the propulsion unit(s) and represents the dynamic braking effort applied through the propulsion motors.

The level detector circuit 330 generates a threshold signal when the total braking effort signal received from summing circuit 320 exceeds a predetermined threshold. The delay circuit 340 generates a level signal after having received the threshold signal throughout a preset time period. The emergency relay driver 310 controls a first emergency contact in series within the second feed line. When emergency relay driver 310 receives an emergency signal from the brake control system, it conveys an emergency detect signal and opens a first emergency contact thereby preventing the dynamic braking effort signal from contributing to the total braking effort signal. It opens simultaneously a second emergency contact thereby preventing feedback concerning the state and condition of the EMRL contacts from reaching the communication means 210 along status line 311.

The valve relay driver 360 controls the opening and closing of the SR1 and SR2 contacts. Two of the SR1 contacts are in series with the power and return control lines that feed the coil of EAV valve 410. Another two of the SR1 contacts are in series with a status line 411 feeding into communication means 210. Likewise, two of the SR2 contacts are in series with the power and return control lines that feed the coil of RV 430. Another two of the SR2 contacts are in series with a status line 431 feeding into communication means 210. Through these two solenoid status lines, brake assurance means 300 passes feedback concerning the state of the valves as well as the state and condition of the SR1 and SR2 contacts to communication means 210. Valve relay driver 360 when activated closes the solenoid contacts thereby permitting local control means 230 to control the EAV 410 and RV 430 magnet valves. When deactivated, valve relay driver 360 opens the solenoid contacts thereby preventing the local control means 230 from controlling the EAV and RV valves.

The timer circuit 350 has a set input, a trigger input and a reset input. When the set input receives an indication that both the level signal and a zero speed signal occur simultaneously, timer circuit 350 activates valve relay driver 360 thereby placing brake assurance means 300 in a standby mode of operation. During the standby mode, timer circuit 350 monitors (via OR gate 301) the trigger input for the emergency detect signal and a full service demand signal in response to either or both of which timer circuit 350 becomes enabled. If the reset input receives the level signal within a predetermined time after timer circuit 350 has become enabled then timer circuit 350 resets thereby keeping brake assurance means 300 in the standby mode. Otherwise, timer circuit 350 deactivates valve relay driver 360 thereby placing brake assurance means 300 in an intervention mode of operation.

The brake assurance means 300 operates in the intervention mode in response to the predetermined set of conditions set forth above or in response to a loss of power. Once brake assurance means 300 is placed into the intervention mode, it will not return to the standby mode and reactivate valve relay driver 360 until timer circuit 350 receives the set signal at its set input via AND gate 302.

Certain authorities in the train industry require that wheel slip control be inhibited during emergency brake applications. Brake assurance means 300 may therefore include two wheel slip inhibit (WSI) contacts as shown in FIGS. 5A and B. One WSI contact is in series with the power line that feeds the coil of emergency application valve 410. The other WSI contact is in series with the power line that feeds the coil of release valve 430. Either the MEU or universal unit 100 may control the opening and closing of the WSI contacts as noted previously.

Should wheel slip control be provided, the MEU via local control means 230 would at the very least briefly open (energize) RV 430 during wheel slippage to reduce the pressure in the brake cylinders in the previously described manner. This would reduce the braking force being applied to the wheels of the truck to the point where the wheels are no longer sliding along the rails. When the wheels stop sliding, the MEU via the universal units would again bring the braking force up to the level requested by the brake control system via the brake command signal.

The wheel slip control function, however, may be inhibited during emergency braking by opening the WSI contacts in the brake assurance means. With the WSI contacts open, the EAV and RV will each assuredly be deenergized (open and closed, respectively). This, of course, allows emergency brake control pressure from SAP & BP control unit 900 to continue to build at brake control port 654 of variable load relay valve 601. VLRV 601 responds accordingly by providing to the brake cylinders the corresponding load compensated brake cylinder pressure. The brakes respond by applying the emergency braking force to the wheels of the truck.

The WSI contacts come into play while brake assurance means 300 operates in the standby mode and the MEU via local control means 230 commands an emergency brake application. By opening the WSI contacts during these conditions, wheel slip control can be inhibited during emergency braking. It should be apparent that the wheel slip control may optionally be inhibited during service braking.

While the presently preferred embodiment and various related aspects of the instant invention have been set forth in detail according to the Patent Act, those persons of ordinary skill in the technical art to which this invention pertains will recognize various alternative ways of practicing the invention without departing from the spirit and scope of the appended claims.

Accordingly, to promote the progress of science and useful arts, we secure for ourselves by Letters Patent exclusive rights to all subject matter embraced by the following claims for the time prescribed by the Patent Act.

We claim:

1. A pneumatic trainline control unit for use with a universal pneumatic brake control unit on a rail vehicle of a train, such universal unit including a relay valve supply port, a service application supply port and an emergency application supply port, such rail vehicle including a supply reservoir, a main reservoir, a straight air pipe for conveying service and release braking requests and a brake pipe for conveying an emergency braking request, such train including a central controller for issuing said braking requests, said pneumatic trainline control unit comprising:

(a) a straight air pipe apply valve for allowing air from said straight air pipe to flow to a pipe network when said apply valve is opened by said central controller approximately coincident with issuance of said service braking request;

(b) a straight air pipe release valve for venting air from said straight air pipe to atmosphere when said release valve is opened by said central controller approximately coincident with issuance of said release braking request;

(c) an emergency transfer valve having a transfer pilot port in communication with said brake pipe such that said emergency transfer valve permits said straight air pipe to communicate with said service and said emergency application supply ports unless said transfer pilot port receives said emergency braking request in which case said emergency transfer valve permits said pipe network to communicate with said service and said emergency application supply ports;

(d) a straight air pipe transducer for converting pressure received from said straight air pipe to an electrical brake command signal;

(e) a transmission means for communicating said brake command signal received from said straight air pipe transducer to a brake control bus on such rail vehicle;

(f) a low pressure switch set to close when pressure in said brake pipe reaches or exceeds a preset low pressure;

(g) a brake pipe charging valve for allowing air from said pipe network to charge said brake pipe to at least a minimum threshold pressure once said charging valve is opened upon both closure of said low pressure switch and command from said central controller;

(h) a brake pipe emergency release valve for venting air from said brake pipe to atmosphere when said emergency release valve is opened by said central controller approximately coincident with issuance of said emergency braking request;

(i) a brake pipe maintaining valve having a main pilot port in communication with said brake pipe such that said maintaining valve maintains pressure within said brake pipe by permitting air from said pipe network to charge said brake pipe via a choke unless pressure at said main pilot port falls below said minimum threshold in which case said maintaining valve closes thereby preventing air from said pipe network from so charging said brake pipe;

(j) said pipe network for allowing air received from at least one of said apply valve, said straight air pipe and said main reservoir to flow to at least one of said emergency transfer valve, said charging valve, said maintaining valve, said supply reservoir and said relay valve supply port of such universal unit; and (k) a vent valve for venting air from said brake pipe to atmosphere when pressure within said brake pipe drops faster than a predetermined rate so as to assist in propagating said emergency braking request throughout such train.

2. The pneumatic trainline control unit recited in claim 1 further including a regulating valve for receiving air from said main reservoir and regulating said air for supply to said pipe network.

3. The pneumatic trainline control unit recited in claim 2 further including a filter in series between said main reservoir and an input to said regulating valve for removing particulate matter from incoming air.

4. The pneumatic trainline control unit recited in claim 3 further including a straight cut-out cock also connected to said filter through which moisture and other contaminants contained within said incoming air can be expelled from said pneumatic trainline control unit.

5. The pneumatic trainline control unit recited in claim 4 further including a vented cut-out cock in series between said main reservoir and said filter.

6. The pneumatic trainline control unit recited in claim 5 further including a high pressure switch set to close when pressure in said brake pipe reaches or exceeds a preset high pressure and used in a circuit through which to inform a train operator of same.

7. The pneumatic trainline control unit recited in claim 1 further including a high pressure switch set to close when pressure in said brake pipe reaches or exceeds a preset high pressure and used in a circuit through which to inform a train operator of same.

8. The pneumatic trainline control unit recited in claim 6 further including a one way check valve for preventing air from said supply reservoir and said relay valve supply port of such universal unit from flowing back into said pipe network.

9. The pneumatic trainline control unit recited in claim 8 further including a one way check valve for preventing air from said pipe network from flowing to said straight air pipe but allowing air from said straight air pipe to flow to said pipe network.

10. A pneumatic trainline control unit for use with a brake control system of a train, such train including a straight air pipe for conveying service and release braking requests, a brake pipe for conveying an emergency braking request and a central controller for issuing said braking requests, said control unit comprising:

(a) a straight air pipe apply valve for allowing air from said straight air pipe to flow to a pipe network when said apply valve is opened by said central controller;

(b) a straight air pipe release valve for venting air from said straight air pipe to atmosphere when said release valve is opened by said central controller;

(c) an emergency transfer valve having a transfer pilot port in communication with said brake pipe such that said emergency transfer valve permits said straight air pipe to communicate with a command port of said control unit unless said transfer pilot port receives said emergency braking request in which case said emergency transfer valve permits said pipe network to communicate with said command port;

(d) a straight air pipe transducer for converting pressure received from said straight air pipe to an electrical brake command signal;

(e) a transmission means for communicating said brake command signal received from said straight air pipe transducer to a brake control bus;

(f) a low pressure switch set to close when pressure in said brake pipe reaches or exceeds a preset low pressure;

(g) a brake pipe charging valve for allowing air from said pipe network to charge said brake pipe to at least a minimum threshold pressure once said charging valve is opened upon both closure of said low pressure switch and a manually initiated command from said central controller;

(h) a brake pipe emergency release valve for venting air from said brake pipe to atmosphere when said emergency release valve is opened by said central controller;

(i) a brake pipe maintaining valve having a main pilot port in communication with said brake pipe such that said maintaining valve maintains pressure within said brake pipe by permitting air from said pipe network to charge said brake pipe via a choke unless pressure at said main pilot port falls below said minimum threshold in which case said maintaining valve closes thereby preventing air from said pipe network from so charging said brake pipe;

(j) said pipe network for allowing air received from at least one of said apply valve, said straight air pipe and a primary port of said control unit to flow to at least one of said emergency transfer valve, said charging valve, said maintaining valve and a master port of said control unit; and (k) a vent valve for venting air from said brake pipe to atmosphere when pressure within said brake pipe drops faster than a predetermined rate.

11. The pneumatic trainline control unit recited in claim 10 further including a regulating valve for receiving air from said primary port and regulating said air for supply to said pipe network.

12. The pneumatic trainline control unit recited in claim 11 further including a filter in series between said primary port and an input to said regulating valve for removing particulate matter from incoming air.

13. The pneumatic trainline control unit recited in claim 12 further including a straight cut-out cock also connected to said filter through which moisture and other contaminants contained within said incoming air can be expelled via a drain port of said control unit.

14. The pneumatic trainline control unit recited in claim 13 further including a vented cut-out cock in series between said primary port and said filter.

15. The pneumatic trainline control unit recited in claim 14 further including a high pressure switch set to close when pressure in said brake pipe reaches or exceeds a preset high pressure and used in a circuit through which to inform a train operator of same.

16. The pneumatic trainline control unit recited in claim 10 further including a high pressure switch set to close when pressure in said brake pipe reaches or exceeds a preset high pressure and used in a circuit through which to inform a train operator of same.

17. The pneumatic trainline control unit recited in claim 15 further including a one way check valve for preventing air at said master port from flowing back into said pipe network.

18. The pneumatic trainline control unit recited in claim 17 further including a one way check valve for preventing air from said pipe network from flowing to said straight air pipe but allowing air from said straight air pipe to flow to said pipe network.

19. A pneumatic trainline control unit for use with a brake control system of a train, such train including a first pneumatic trainline for conveying service and release braking requests, a second pneumatic trainline for conveying an emergency braking request and a central controller for issuing said braking requests, said control unit comprising:

(a) an apply valve for allowing air from said first pneumatic trainline to flow to a pipe network when said apply valve is opened by said central controller;

(b) a release valve for venting air from said first pneumatic trainline to atmosphere when said release valve is opened by said central controller;

(c) an emergency transfer valve having a transfer pilot port in communication with said second pneumatic trainline such that said emergency transfer valve permits said first pneumatic trainline to communicate with a command port of said control unit unless said transfer pilot port receives said emergency braking request in which case said emergency transfer valve permits said pipe network to communicate with said command port;

(d) a transducer for converting pressure received from said first pneumatic trainline to an electrical brake command signal;

(e) a transmission means for communicating said brake command signal received from said transducer to a brake control bus;

(f) a low pressure switch set to close when pressure in said second pneumatic trainline reaches or exceeds a preset low pressure;

(g) a charging valve for allowing air from said pipe network to charge said second pneumatic trainline to at least a minimum threshold pressure once said charging valve is opened upon both closure of said low pressure switch and a manually initiated command from said central controller;

(h) an emergency release valve for venting air from said second pneumatic trainline to atmosphere when said emergency release valve is opened by said central controller;

(i) a maintaining valve having a main pilot port in communication with said second pneumatic trainline such that said maintaining valve maintains pressure within said second pneumatic trainline by permitting air from said pipe network to charge said second pneumatic trainline via a choke unless pressure at said main pilot port falls below said minimum threshold in which case said maintaining valve closes thereby preventing air from said pipe network from so charging said second pneumatic trainline;

(j) a regulating valve for receiving air from a primary port of said control unit and regulating said air for supply to said pipe network;

(k) said pipe network for allowing air received from at least one of said apply valve, said first pneumatic trainline and said regulating valve to flow to at least one of said emergency transfer valve, said charging valve, said maintaining valve and a master port of said control unit; and (l) a vent valve for venting air from said second pneumatic trainline to atmosphere when pressure within said second pneumatic trainline drops faster than a predetermined rate.

20. The pneumatic trainline control unit recited in claim 19 further including:

(a) a first one way check valve for preventing air at said master port from flowing back into said control unit; and (b) a second one way check valve for preventing air from said pipe network from flowing to said first pneumatic trainline but allowing air from said first pneumatic trainline to flow to said pipe network.

21. The pneumatic trainline control unit recited in claim 20 further including a filter in series between said primary port and an input to said regulating valve for removing particulate matter from incoming air.

22. The pneumatic trainline control unit recited in claim 21 further including a straight cut-out cock also connected to said filter through which moisture and other contaminants contained within said incoming air can be expelled via a drain port of said control unit.

23. The pneumatic trainline control unit recited in claim 22 further including a vented cut-out cock in series between said primary port and said filter.

24. The pneumatic trainline control unit recited in claim 23 further including a high pressure switch set to close when pressure in said second pneumatic trainline reaches or exceeds a preset high pressure and used in a circuit through which to inform a train operator of same.

* * * * *